Oct. 22, 1935. H. W. DENHARD 2,018,398
CLAMP
Filed Jan. 4, 1935
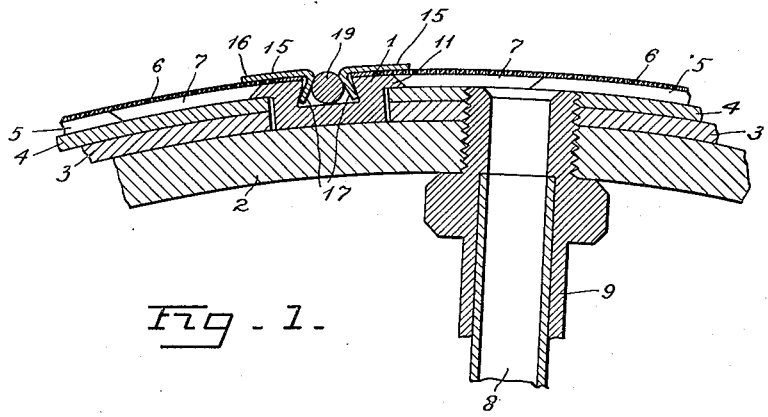
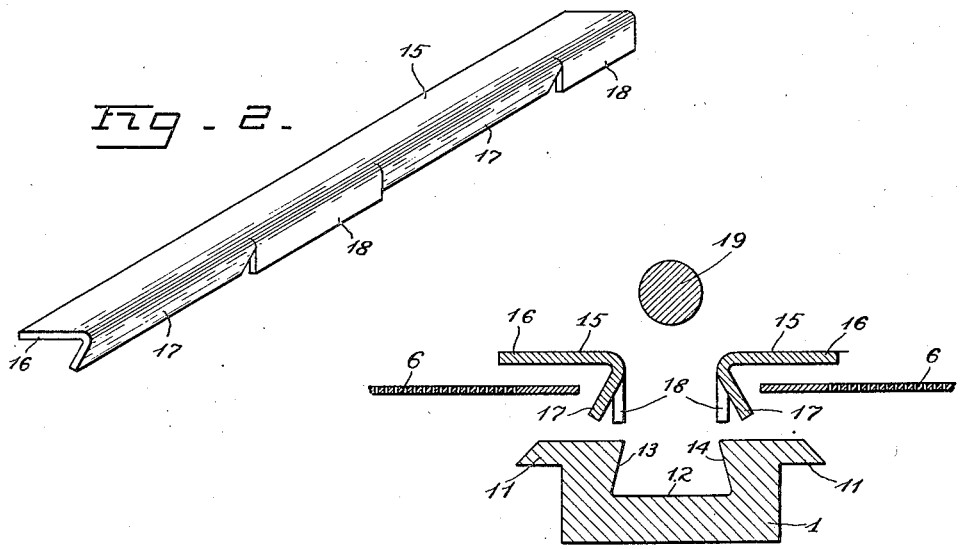
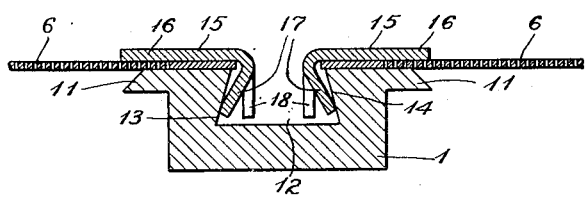
INVENTOR.
HARRY W. DENHARD.
BY
ATTORNEY Patented Oct. 22, 1935

2,018,398

UNITED STATES PATENT OFFICE 2,018,398

CLAMP

Harry W. Denhard, Oakland, Calif., assignor to Oliver United Filters Incorporated, San Francisco, Calif., a corporation of Nevada Application January 4, 1935, Serial No. 389

4 Claims. (Cl. 210—202)

This invention relates to a clamp for securing or anchoring the edges of a sheet of material, such as cloth, paper, woven wire or sheet metal to a base member. More particularly the invention relates to a clamp for securing the filter medium of a filter to its support, base or frame.

For the purpose of filtering sugar cane settlings resort has been made to a punched sheet metal filtering screen or medium, but considerable difficulty has been experienced in securing this type of filter medium to the cylindrical surface of a continuous sectionalized rotary drum filter. As is well known in the filtration art, the drum of a continuous rotary drum filter is divided into individual sections or compartments by spaced parallel division strips running longitudinally of the drum. To facilitate repair and inspection it is oftentimes desirable to cover each section or compartment with an individual panel of filter medium rather than to cover the drum with a single continuous sheet of filter medium. There is always a certain amount of movement of the filter medium at the point at which it is attached to the division strip, and this movement tends, upon the continued use of a filter, to fracture and weaken the filter medium at this point. This is particularly true where the filter medium has a sharp bend at this point and is made from perforated sheet metal. To lessen this difficulty it has been found desirable to refrain from forming any sharp bend in the filter medium.

In general the object of this invention is the provision of a mechanism by which the edges of the various panels of filter medium forming the surface of a rotary drum filter may be detachably clamped to their respective division strips without resorting to sharp bends in the filter medium itself.

More specifically the object of the invention is the provision of a base member having a channel therein formed with undercut walls and provided with a V-shaped clip and a wedge member for detachably locking adjacent panels of filter medium to the upper face of the channeled base member.

The invention possesses other advantageous features, some of which with the foregoing, will be set forth at length in the following description where that form of the invention which has been selected for illustration in the drawing is outlined in full. In said drawing, one form of the invention is shown, but it is to be understood that it is not limited to such form, since the invention as set forth in the claims may be embodied in a plurality of forms.

Referring to the drawing:

Figure 1 is a cross section of a portion of the periphery of a rotary drum filter illustrating one form of the invention as applied to the division strip of the filter.

Figure 2 is an isometric view of one of the V-shaped clips used for holding the filter medium in place.

Figure 3 is an exploded view of a division strip, the adjacent panels of filter medium, the V-shaped locking strip and the rod used for wedging the V-shaped clip in position.

Figure 4 is a cross section taken through a division strip with the adjacent panels of filter medium and V-shaped clips in position prior to the insertion of the rod wedge member.

As shown in Figure 1 a division strip 1 is secured to a cylindrical shell 2 in any suitable manner, such as by riveting. Secured either directly to the shell 2 or in the event that shallow compartments are desired, to a spacing member 3, is a supporting screen 4, provided with ribs 5, which serve to hold the filter medium 6 in spaced relation with respect to the supporting screen 4, to thereby form the filter section or compartment 7. As is well known in the industry, communication is established between each of the filter compartments and the filtrate valve by means of suitable filtrate pipes 8 secured to the filter drum by means of a fitting 9.

The division strip 1 is provided with lateral flanges 11 which overhang and rest on the edges of the supporting screen 4.

As best shown in Figures 3 and 4 the division strip 1 is provided with a longitudinally extended channel 12 formed by the undercut lateral faces of the walls 13 and 14. It should be noted that the angle formed by the upper face of the division strip 1 and the lateral undercut faces of the channel 12 is less than 90°. Adapted to straddle each of the shoulders formed by the undercut lateral walls 13 and 14, and the upper face of the division strip, are V-shaped clips 15. These clips are formed by a horizontally extending leg 16 adapted to overlie the edge of the filter medium 6 and a depending leg 17 adapted to engage one of the lateral undercut walls or faces of the channel 12. The angle formed between the legs 16 and 17 of the clips should be somewhat smaller than the angle formed between the upper face of the division strip 1 and the undercut lateral faces. Wings or lugs 18 are cut from the downwardly extending legs 17 of the strips 15, at spaced intervals along the length of the clip, and as clearly shown in Figures 2, 3 and 4 these lugs are bent outwardly or away from the downwardly extending legs 17. As shown in Figure 1 the clips 15 are held in their operative position by means of a rod 19 wedged in the channel 12 against the opposed depending legs 17 and lugs 18 of the clips 15. As can be seen from an inspection of Figure 1 the wedging action of the rod 19 has a tendency to rotate the outer ends of the horizontal legs of the clips 15 about the points at which the depending legs 17 of the clips contact the undercut lateral walls 13 and 14 of the channel 12, thereby clamping the edges of the sections or panels of filter medium 6 against the upper face of the division strip 1. The function of the lug 18 is to form a vertical extension of the apices of the clips against which the rod 19 may press if the center of the rod is forced beneath the apices of the slip.

The division strip 1, the clip 15 and the rod 19 may conveniently be made of brass, and for certain classes of work the panels of filter medium 6 are also made of brass.

It is to be noted that by means of the above construction the individual panels of filter medium may be clamped to their division strips without the necessity of forming sharp bends in them as has been the practice in the past and that as a consequence the minute fractures resulting from bending beyond the elastic limit are obviated. Furthermore, this construction provides a clamp with which the filter medium may be quickly attached or detached by the simple operation of inserting or removing the wedging rod.

I claim:

1. In a filter; a division strip provided with a shoulder having an undercut face; a sheet of filter medium resting on the upper face of said shoulder; a V-shaped clip straddling said filter medium and undercut face and means for locking said clip in place.

2. In a filter; a division strip provided with a pair of spaced shoulders each having an undercut face and forming between them a channel extending longitudinally the length of the division strip; a sheet of filter medium resting on the upper face of each of said shoulders; V-shaped clips straddling said filter medium and the undercut faces of said shoulders and means disposed within said channel for locking said clips in place.

3. In a filter; a division strip provided in its upper face with a longitudinally extending channel having undercut lateral faces; two sections of filter medium disposed over the upper face of said division strip, one on each side of said channel; V-shaped clips engaging the sections of filter medium and said lateral undercut faces, the angle formed between the legs of said clips being less than the angle formed between the upper and lateral faces of the division strip; and means for locking said clips in place.

4. In a filter; a division strip provided in its upper face with a longitudinally extending channel having undercut lateral faces; two sections of filter medium disposed over the upper face of said division strip, one on each side of said channel; V-shaped clips engaging the sections of filter medium and said lateral undercut faces, the angle formed between the legs of said clips being less than the angle formed between the upper and lateral faces of the division strip; outwardly bent legs formed on the lower legs of said clips; and a wedge forced between said clips for clamping said clips against said filter medium and undercut lateral faces.

HARRY W. DENHARD.